US008625688B2

(12) United States Patent
Yeh et al.

(10) Patent No.: US 8,625,688 B2
(45) Date of Patent: Jan. 7, 2014

(54) PRECODING METHOD AND DEVICE

(75) Inventors: Choongil Yeh, Daejeon (KR); Young Seog Song, Daejeon (KR); Min Sik Seo, Daejeon (KR); Dong Seung Kwon, Daejeon (KR); Joon-doo Kim, Seoul (KR); Chungyong Lee, Seoul (KR); Jiwon Kang, Incheon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 74 days.

(21) Appl. No.: 13/139,257

(22) PCT Filed: Nov. 24, 2009

(86) PCT No.: PCT/KR2009/006917
§ 371 (c)(1),
(2), (4) Date: Jun. 10, 2011

(87) PCT Pub. No.: WO2010/067971
PCT Pub. Date: Jun. 17, 2010

(65) Prior Publication Data
US 2011/0243204 A1    Oct. 6, 2011

(30) Foreign Application Priority Data

Dec. 11, 2008  (KR) .................. 10-2008-0126107
Jul. 28, 2009   (KR) .................. 10-2009-0068943

(51) Int. Cl.
*H04K 1/10*   (2006.01)
*H04B 7/02*   (2006.01)

(52) U.S. Cl.
USPC .......................................... 375/260; 375/267

(58) Field of Classification Search
USPC ................................................ 375/260, 267
See application file for complete search history.

(56) References Cited

U.S. PATENT DOCUMENTS 5,388,124 A * 2/1995 Laroia et al. .................. 375/286
6,996,230 B1 * 2/2006 Chu et al. .................. 379/406.08

(Continued)

FOREIGN PATENT DOCUMENTS

KR   10-2008-0024815    3/2008
KR   10-2008-0042434    5/2008

(Continued)

OTHER PUBLICATIONS

Joon-doo Kim, et al.: "An Improved Block Tomlinson-Harashima Precoder for Multiuser MIMO Systems", 23rd International Technical Conference on Circuits/Systems, Computers and Communications, ITC-CSCC, 2008, pp. 1373-1376.

(Continued)

*Primary Examiner* — Leon-Viet Nguyen
*Assistant Examiner* — Sarah Hassan (57) ABSTRACT

A method for a transmitting terminal in a multi-user multi-antenna environment to perform precoding includes: receiving feedback information from a plurality of receiving terminals; estimating a channel between the transmitting terminal and the plurality of receiving terminals by using the feedback information; and generating a plurality of transmission symbols by applying a first nonlinear precoding method and a second nonlinear precoding method to a plurality of symbols and the estimated channel to be transmitted to the plurality of receiving terminals. The first nonlinear precoding method is used to eliminate interference between subchannels of the same receiving terminal, and the second nonlinear precoding method is used to eliminate interference between the receiving terminals.

20 Claims, 6 Drawing Sheets

(56) References Cited

U.S. PATENT DOCUMENTS

| | | | |
|---|---|---|---|
| 2006/0198459 A1* | 9/2006 | Fischer et al. | 375/267 |
| 2006/0274825 A1* | 12/2006 | Cioffi et al. | 375/222 |
| 2007/0041428 A1* | 2/2007 | Wang et al. | 375/146 |
| 2007/0086543 A1* | 4/2007 | David et al. | 375/299 |
| 2008/0159425 A1* | 7/2008 | Khojastepour et al. | 375/260 |
| 2008/0181285 A1 | 7/2008 | Hwang et al. | |
| 2009/0010359 A1* | 1/2009 | Hwang et al. | 375/297 |
| 2009/0075686 A1* | 3/2009 | Gomadam et al. | 455/500 |

FOREIGN PATENT DOCUMENTS

| | | |
|---|---|---|
| KR | 10-2008-0071097 | 8/2008 |
| KR | 10-2008-0080722 | 9/2008 |
| WO | WO 2008/065462 A2 | 6/2008 |

OTHER PUBLICATIONS

Bertrand M. Hochwald, et al.: "A Vector-Perturbation Technique for Near-Capacity Multiantenna Multiuser Communication—Part II: Perturbation", IEEE Trans. on Comm., vol. 53, No. 3, pp. 537-544, Mar. 2005.

International Search Report and Written Opinion of International Searching Authority dated Jun. 29, 2011 in connection with PCT Application No. PCT/KR2009/006917.

Robert F.H. Fischer, et al.: "Precoding in Multiantenna and Multiuser", IEEE Transactions on Wireless Communications, vol. 3, No. 4, Jul. 2004, pp. 1305-1316.

* cited by examiner

PRECODING METHOD AND DEVICE

CROSS-REFERENCE TO RELATED APPLICATION(S)

The present application claims priority under 35 U.S.C. §365 to International Patent Application No. PCT/KR2009/006917 filed Nov. 24, 2009, entitled "PRECODING METHOD AND DEVICE". International Patent Application No. PCT/KR2009/006917 claims priority under 35 U.S.C. §365 and/or 35 U.S.C. §119(a) to Korean Patent Application No. 10-2008-0126107 filed Dec. 11, 2008 and Korean Patent Application No. 10-2009-0068943 filed Jul. 28, 2009, and which are incorporated herein by reference into the present disclosure as if fully set forth herein.

TECHNICAL FIELD

The present invention relates to a precoding method and device.

BACKGROUND ART

A mobile communication system (hereinafter, a MIMO system) using a multiple input multiple output (MIMO) scheme transmits data through individual channels that are formed among multiple antennas at transmitting/receiving terminals to thus acquire greater data rates than a system using a single antenna.

Assuming that the transmitting terminal or the receiving terminal knows channel information in the MIMO system, interference signals can be removed through an appropriate detection scheme or a precoding scheme.

The MIMO system is applicable to a cellular system simultaneously supporting multiple users. Since it is generally impossible for user terminals to communicate cooperatively, a base station transmits signals through a precoding method so as to prevent interference between the user terminals.

The method for removing inter-user interference in the multiple-user supporting MIMO system is originated from the dirty paper coding method. According to the dirty paper coding method, the inter-user interference can be completely eliminated without any loss of transmittable data, but since the method is excessively complicated, a simplified nonlinear method such as the Tomlinson-Harashima precoder (THP) or a linear method such as block diagonalization is used.

The block diagonalization method shows relatively simple and good performance against errors, but increases loss of channel capacity when the number of users who are simultaneously supported is increased. On the contrary, the THP method has the advantage of less loss of channel capacity even when the number of users is increased, but the system has considerable complexity and its performance against errors is worsened when there are relatively lesser number of users in the system.

Among the methods for improving the above-noted drawbacks of the block diagonalization method and the THP method, there are the block THP (BTHP) method for eliminating inter-user interference so as to improve error processing performance of the THP by using the user's multiple antennas, and the maximum likelihood (ML) receiving method designed for the same.

The ML-applied BTHP method generates excellent error processing performance compared to the existing THP methods, but provides degraded error processing performance compared to the ML-applied block diagonalization method, and each user terminal must cover the great complexity of the ML receiving method.

Therefore, a method for reducing the complexity of the ML-applied BTHP in the user terminal or moving the complexity to the base station which is relatively robust for it while increasing error processing performance of the ML-applied BTHP is required.

The vector perturbation (VP) method, similar to the THP method, infinitely increases an equivalent transmission symbol through a modulo operation, and transmits a symbol having the least power when the channel's inverse matrix is multiplied thereto.

The VP method is a kind of nonlinear channel inversion (CI) method and generates the same effect of moving the ML receiving method to the base station, and the user terminal can finish detection through the modulo operation without channel information. However, since the method steeply increases the complexity as the number of the antennas is increased in a like manner of the ML method, it is difficult to apply the method to the multi-user MIMO system.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a precoding method and device for efficiently eliminating interference in a multi-user multi-antenna system.

Solution to Problem

An exemplary embodiment of the present invention provides a method for a transmitting terminal in a multi-user multi-antenna environment to perform precoding, including: receiving feedback information from a plurality of receiving terminals; estimating a channel between the transmitting terminal and the plurality of receiving terminals by using the feedback information; and generating a plurality of transmission symbols by applying a first nonlinear precoding method and a second nonlinear precoding method to a plurality of symbols and the estimated channel to be transmitted to the plurality of receiving terminals.

Another embodiment of the present invention provides a precoding device in a multi-user multi-antenna environment, including: a feedback receiver for receiving feedback information from a plurality of receiving terminals in the same service area; a controller for estimating a channel between the transmitting terminal and the plurality of receiving terminals by using the feedback information; and an interference eliminator for generating a plurality of transmission symbols from which interference is eliminated by applying a first nonlinear precoding method and a second nonlinear precoding method to a plurality of symbols and the estimated channel to be transmitted to the plurality of receiving terminals.

The first nonlinear precoding method is used to eliminate interference between sub-channels of the same receiving terminal, the second nonlinear precoding method is used to eliminate interference between the receiving terminals, and the first nonlinear precoding method and the second nonlinear precoding method are combined to be applied to the plurality of symbols and the estimated channel.

The first nonlinear precoding method uses the vector perturbation (VP) method, and the second nonlinear precoding method uses the block Tomlinson-Harashima precoder (BTHP) method.

Advantageous Effects of Invention

According to an embodiment of the present invention, the multi-user MIMO system combines the BTHP method and the VP method, and hence the BTHP method rolls the user's complexity burden to the base station through the VP method and acquires better error processing performance, and the VP method applies the VP method to respective subchannels through the BTHP method to cover some degradation of error processing performance and reduce complexity and thereby control complexity and error processing performance of the system.

Also, since the transmitting terminal removes interference between all subchannels through the VP scheme, the user can estimate the transmitted signal without any information about channel state but the predetermined modulo boundary value, and the base station can control system complexity and error performance irrespective of the number of receiving antennas the users have. In detail, the transmission signal can be demodulated with the modulo operation without the user's knowing channel information of the entire system or estimating the valid channel after removing inter-user interference. Further, the size of the sub-blocks of the BTHP for eliminating inter-user interference can be determined irrespective of the number of the user's antennas.

BEST MODE FOR CARRYING OUT THE INVENTION

In the following detailed description, only certain exemplary embodiments of the present invention have been shown and described, simply by way of illustration. Accordingly, the drawings and description are to be regarded as illustrative in nature and not restrictive. Like reference numerals designate like elements throughout the specification.

Figure 1:
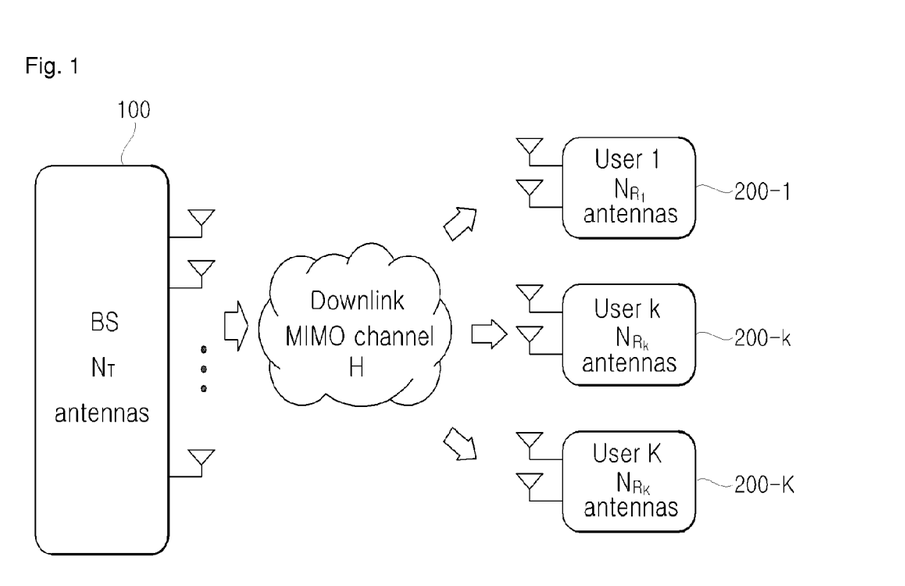
FIG. 1 shows a MIMO system in a multi-user environment according to an exemplary embodiment of the present invention.

FIG. 1 shows a MIMO system in a multi-user environment according to an exemplary embodiment of the present invention.

In FIG. 1, the MIMO system under the multi-user environment includes a base station 100 having $N_T$ transmitting antennas, and K users 200-1, 200-$k$, to 200-K with $N_{R_K}$ receiving antennas provided in the service area of the corresponding base station 100.

The base station 100 of the multi-antenna system is assumed to accurately estimate downlink channel information of users 200-1, 200-$k$, and 200-K through an uplink sounding signal or analog feedback received from the users 200-1, 200-$k$, and 200-K provided in the service area.

Also, for ease of description, the users 200-1, 200-$k$, and 200-K who are receiving terminals are assumed to have the same number $N_R$ of antennas, and the base station 100 that is the transmitting terminal is assumed to use the same modulation method.

Figure 2:
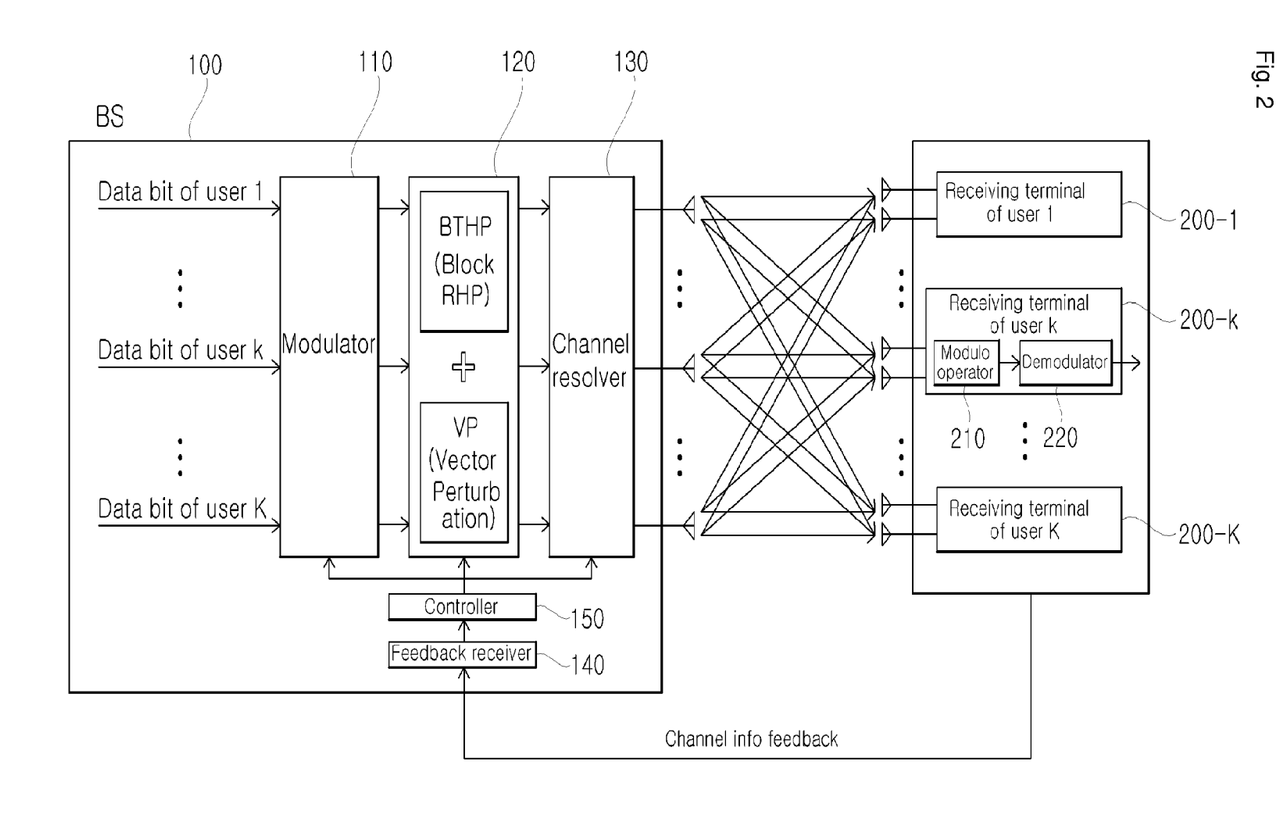
FIG. 2 shows a block diagram of a MIMO system in a multi-user environment according to an exemplary embodiment of the present invention.

FIG. 2 shows a block diagram of a MIMO system in a multi-user environment according to an exemplary embodiment of the present invention.

In FIG. 2, the base station 100 that is a transmitting terminal includes a modulator 110, an interference eliminator 120, a channel resolver 130, a feedback receiver 140, and a controller 150.

The modulator 110 modulates encoded data of an information bit stream according to a predetermined modulation scheme to provide transmission symbols. Also, the modulator 110 maps the encoded data on the symbols for expressing positions according to the amplitude and phase constellations. Any modulation schemes are usable, and can be the m-quadrature phase shift keying (m-PSK) or the m-quadrature amplitude modulation (m-QAM). For example, the m-PSK can be BPSK, QPSK, or 8-PSK, and the m-QAM can be 16-QAM, 64-QAM, or 256-QAM.

The interference eliminator 120 eliminates interference existing between the transmission symbols of the same user and interference between the users by using estimated channel information. A first nonlinear precoding scheme can be used so as to eliminate interference existing between the same user's transmission symbols, and a second nonlinear precoding scheme can be used so as to eliminate interference between users. The first nonlinear precoding scheme adopts the vector perturbation (VP) scheme, and the second nonlinear precoding scheme adopts the block Tomlinson-Harashima precoder (BTHP) scheme. The first nonlinear precoding scheme and the second nonlinear precoding scheme are not successively applied but are simultaneously applied in a combined form. Hereinafter, the combined method of the BTHP and the VP will be called the BTHP-VP scheme.

In the exemplary embodiment of the present invention, the VP schemes following the minimum mean squared error (MMSE) scheme and the zero-forcing (ZF) scheme are usable.

In the interference elimination process, the constellations that are infinitely reproduced by the modulo operation are shared, and an appropriate code vector is added by the modulo operation. The above-noted interference elimination process will be described in detail with equations.

Also, the interference eliminator 120 uses channel information estimated by feedback information so as to eliminate interference existing between the same user's transmission symbols and interference between users. That is, the BTHP method and the VP method need to predict which interference signal will come to the signal to be transmitted so as to eliminate the interference signal, and the interference signal is fixed through information on the signal and the channel to be transmitted by the transmitting terminal. Therefore, assuming that the channel information that is fed back is accurate, the transmitting terminal estimates in advance the interference to be undergone by the signal while being transmitted to the receiving terminal, and changes the form of the transmission signal so as to eliminate the influence of the interference signal.

The channel resolver 130 multiplies the entire system channel by a predetermined channel resolution filter F to resolve the entire channel into block triangular forms. To achieve this, as an example, the channel resolver 130 can acquire a matrix in the block triangular form (or a staircase form) having sub-blocks with a desired size from the entire channel matrix by using the block QR (BQR) scheme.

The feedback receiver 140 receives the uplink sounding signal or analog feedback signal from the users 200-1, 200-k, and 200-K through the antenna, process it into a digital signal, and transmits the digital signal to the controller 160. Information extracted from the signal received by the receiving circuit 170 includes channel quality information (CQI). The CQI represents information for the receiver to feed the channel environment, coding scheme, or modulation scheme back to the transmitter 100, and in detail, it includes at least one of per-channel power information, per-channel signal-to-noise ratio (SNR) information, and index information for designating a specific coding rate and/or modulation scheme or modulation size. The signal to interference and noise ratio (SINR) other than the SNR can be used, and the modulation and coding scheme (MCS) level index can be used for the index information.

The controller 150 controls the base station 100, and estimates a downlink channel for the respective users 200-1, 200-k, and 200-K by using feedback information transmitted by the feedback receiver 140, and transmits estimated channel information to the interference eliminator 120.

The users 200-1, 200-k, and 200-K of the receiving terminal respectively include a modulo operator 210 and a demodulator 220.

The modulo operator 210 performs a modulo operation on the signal provided by the base station to generate a normalized information symbol vector and a noise-added signal. The users 200-1, 200-k, and 200-K acquire an information symbol by performing a predetermined modulo operation on the received signal since the subchannel existing in the diagonal direction of the valid channel matrix in the block triangular form receives the signal through the inverted matrix through the VP scheme.

The demodulator 220 provides encoded data of the information bit stream by demodulating the transmission symbols generated by the modulo operator 210 according to a predetermined demodulation scheme.

Figure 3:
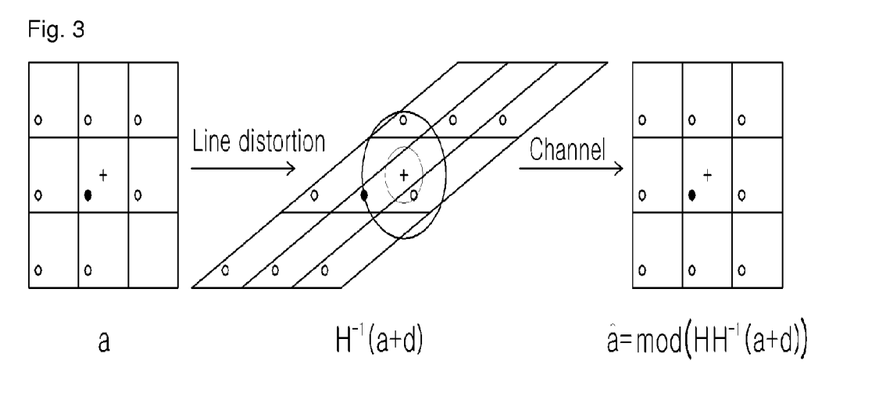
FIG. 3 shows a concept of a VP method used for an exemplary embodiment of the present invention.

FIG. 3 shows a concept of a VP method used for an exemplary embodiment of the present invention.

In FIG. 3, the VP scheme assumes the vector a as data to be transmitted, generates an infinite equivalent signal vector through the modulo scheme, and transmits the signal vector with the least transmission power that is generated by multiplying the infinite equivalent signal vector by the channel's inverse matrix, thereby reducing the increase of transmission power. Each user can restore the data through a simple modulo operation, without knowing channel information.

The VP scheme transmits the optimal signal through an ML-based search at the transmitting terminal to thus outperform channel inversion (CI), but as it is impossible to consider all the infinite equivalent vectors, it is desirable to realize it through reduction of calculation by using the sphere encoding method.

Figure 4:
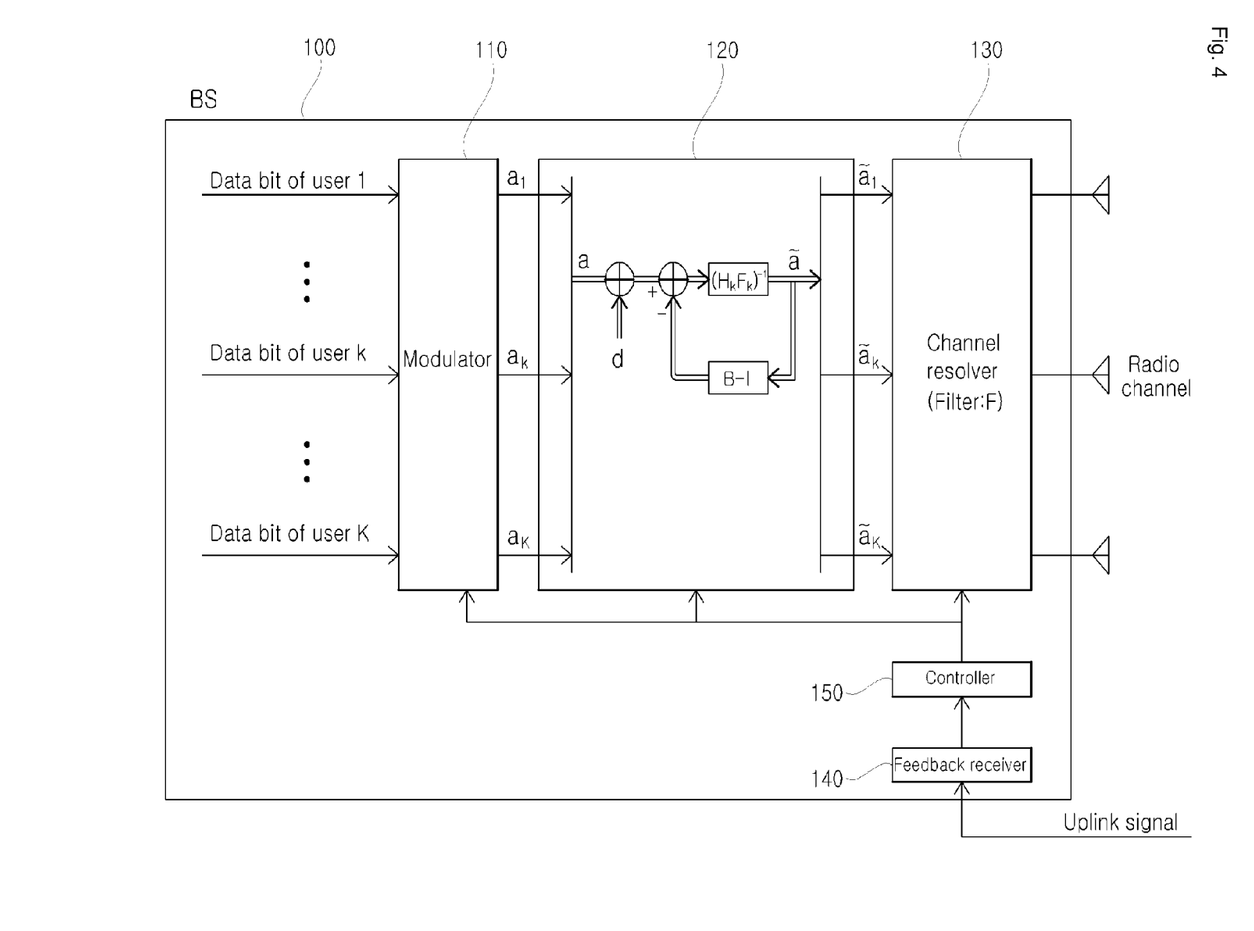
FIG. 4 shows a detailed block diagram of a base station according to an exemplary embodiment of the present invention.

FIG. 4 shows a detailed block diagram of a base station according to an exemplary embodiment of the present invention. Here, the method for the interference eliminator 120 to apply the BTHP-VP scheme will be described.

When the entire channel matrix of the system is given as H and the precoding matrix for performing block triangulation to the entire channel matrix is given as F, the H and F are expressed as follows.

$$H = [H_1^T H_2^T \ldots H_K^T]^T$$

$$F = [F_1 F_2 \ldots F_K]$$

When the data to be transmitted to the users 200-1, 200-k, and 200-K are defined to be modulated symbol vectors $$a = [a_1^T a_2^T \ldots a_K^T]^T,$$

the symbol vector $$\tilde{a}_k$$

of the k-th user for the BTHP-VP scheme is defined as Equation 1.

$$\tilde{a}_k = (H_k F_k)^{-1}\left(a_k - \sum_{j=1}^{k-1} H_k F_j \tilde{a}_j + d_k\right) \quad \text{(Equation 1)}$$

Here, the perturbing vector $d_k$ is defined as follows.

$$d_k = \underset{d'_k}{\mathrm{argmin}} \left\|(H_k F_k)^{-1}\left(a_k - \sum_{j=1}^{i-1} H_k F_j \tilde{a}_j + d_k\right)\right\|^2 \quad \text{(Equation 2)}$$

In this instance, when a random vector is selected from among all codeword vectors that may occur by the modular operation, the vector is called $d'_k$, and the vector for minimizing the cost function will be defined as $d_k$.

As a result, when the transmission signal vector is $$s = \frac{1}{\sqrt{\gamma}} F\tilde{a},$$

the k-th user's received signal vector $r_k$ can be expressed as a form of Equation 3 which has no interference signal. Here, $\gamma$ is the long term normalization factor.

$$\begin{aligned} r_k &= \frac{1}{\sqrt{\gamma}} \sum_{j=1}^{k} H_k F_j \tilde{a}_j + n_k \\ &= \frac{1}{\sqrt{\gamma}}\left(H_k F_k (H_k F_k)^{-1}\left(a_k - \sum_{j=1}^{k-1} H_k F_j \tilde{a}_j + d_k\right) + \sum_{j=1}^{k-1} H_k F_j \tilde{a}_j\right) + n_k \\ &= \frac{1}{\sqrt{\gamma}}(a_k + d_k) + n_k \end{aligned} \quad \text{(Equation 3)}$$

Therefore, when the BTHP-VP scheme according to the exemplary embodiment of the present invention is used, the users 200-1, 200-k, and 200-K can estimate the transmitted data through a simple modulo operation without receiving valid channel information from the base station 100 or knowing another user's channel information in advance.

The method for applying the BTHP-VP scheme described with reference to equations will be summarized according to the BTHP method.

First, when a filter for dividing the channel into the block triangular forms through the block QR (BQR) scheme is provided and the actual channel is applied to the channel resolver, the valid channel in the block triangular form is configured. Here, the sub-blocks on the diagonal line are channels for transmitting each user's multiple signals, and the upper user's transmission signal operates as interference to the lower user's transmission signal according to the channel elements existing in the lower diagonal part.

In this state, elimination of the interference signal of the BTHP and control of transmission power are successively performed according to the users' priorities, and the VP scheme is simultaneously applied to each of the users. The symbol set having the same data and the least transmission power is selected through the modulo operation, and hence the final transmission symbol is determined.

Figure 5:
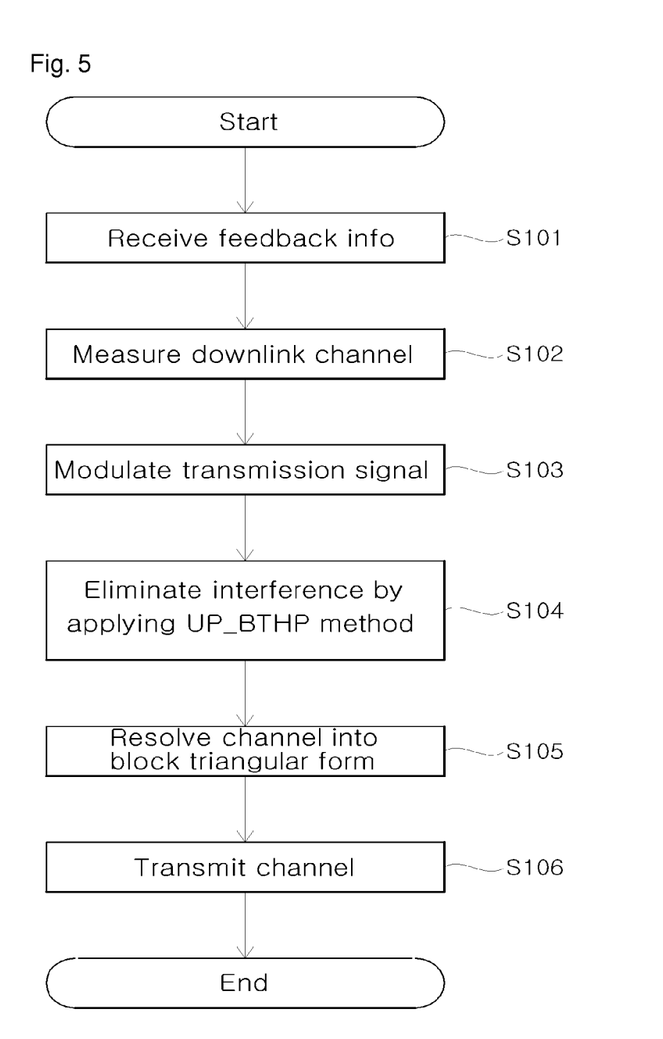
FIG. 5 shows a flowchart of processing steps in a transmitting terminal of a MIMO system according to an exemplary embodiment of the present invention.

FIG. 5 shows a flowchart of a process by a transmitting terminal of a MIMO system according to an exemplary embodiment of the present invention.

Upon receiving feedback information from the users positioned in the service area of the base station, (S101), the base station estimates a downlink channel for the respective users by using digitalized feedback information (S102).

The base station modulates the encoded data of the information bit stream to be transmitted to the user according to a predetermined modulation scheme to generate transmission symbols (S103). In this instance, the base station can determine the modulation method by using the estimated downlink channel information.

The base station eliminates interference between the transmission symbols of the same user and interference between the users by applying the VP scheme and the BTHP scheme (S104). The VP scheme and the BTHP scheme are performed in the combined manner.

The base station multiplies the interference-eliminated entire system channel by a predetermined channel resolution filter F to resolve the entire channel in the block triangular form (S105), and transmits the same to the users through antenna mapping (S106).

Figure 6:
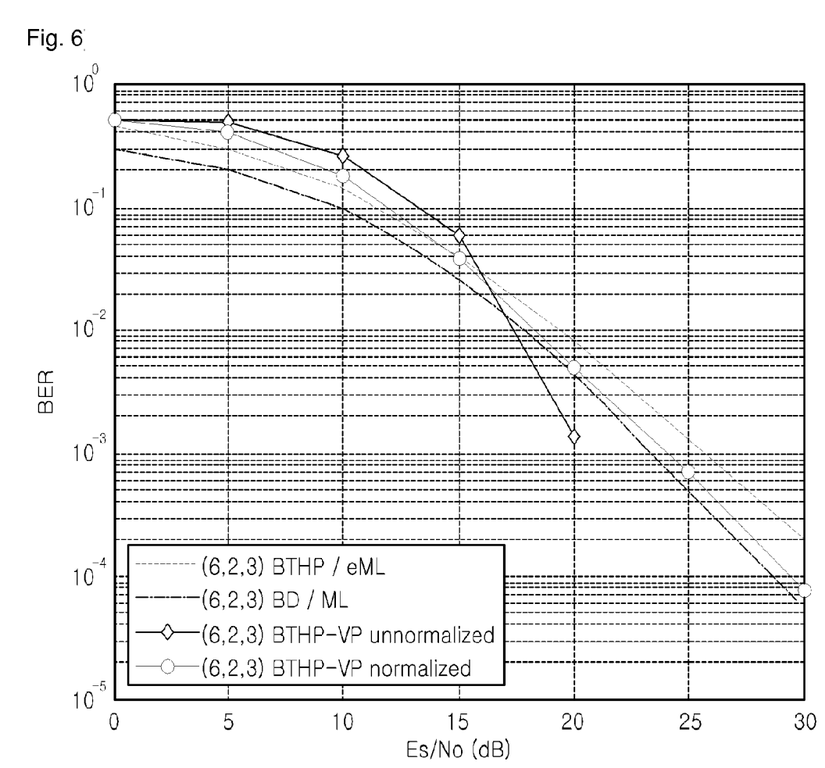
FIG. 6 shows graph of average BER performance of multiple users according to an exemplary embodiment of the present invention by comparing the conventional BD method and the BTHP using the ML method.

FIG. 6 shows graph of average BER performance of multiple users according to an exemplary embodiment of the present invention by comparing the conventional BD method and the BTHP using the ML method. Here, assumed is a multi-user MIMO system having 6 transmitting antennas, 3 users, and 2 antennas per user.

In FIG. 6, the horizontal axis represents the signal to noise ratio, and the vertical axis represents the system's average BER.

As shown in FIG. 6, the BTHP-VP scheme provides excellent performance on the SNR compared to the BTHP scheme to which the conventional ML scheme is applied. The conventional BD method outperforms the BTHP-VP method according to the embodiment of the present invention regarding the low SNR. However, as is generally known, the BD method generates a larger loss of channel capacity than the BTHP method.

Further, for ease of description, the exemplary embodiment of the present invention has described the case in which the number of antennas per user corresponds to the transmission data, and other modifications are allowable with the range of the present invention. In addition, the VP method using the zero forcing type of channel resolution scheme and the general inversion has been used, and it is possible to use the minimum mean squared error type of channel resolution scheme or the regularized VP method.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for performing precoding in a transmitting terminal in a multi-user multi-antenna environment, the method comprising:
   receiving feedback information from a plurality of receiving terminals;
   estimating a channel between a transmitting terminal and the plurality of receiving terminals by using the feedback information; and
   generating a plurality of transmission symbols by applying a first nonlinear precoding method and a second nonlinear precoding method to a plurality of symbols to be transmitted to the plurality of receiving terminals and the estimated channel, wherein the second nonlinear precoding method is different from the first nonlinear precoding method, wherein the first nonlinear precoding method and the second nonlinear precoding method are combined to be applied to the plurality of symbols and the estimated channel.

2. The method of claim 1, wherein the first nonlinear precoding method is used to substantially eliminate interference between subchannels of the same receiving terminal, and the second nonlinear precoding method is used to substantially eliminate interference between the receiving terminals.

3. The method of claim 1, wherein the first nonlinear precoding method uses a vector perturbation (VP) method.

4. The method of claim 1, wherein the second nonlinear precoding method uses a block Tomlinson-Harashima precoder (BTHP) method.

5. The method of claim 1, further comprising resolving the estimated channel into a block triangular form prior to transmitting the plurality of transmission symbols.

6. A precoding device in a multi-user multi-antenna environment, the precoding device comprising:
   a feedback receiver configured to receive feedback information from a plurality of receiving terminals in a service area;
   a controller configured to estimate a channel between the transmitting terminal and the plurality of receiving terminals by using the feedback information; and
   an interference eliminator configured to:
   generate a plurality of transmission symbols by applying a first nonlinear precoding method and a second nonlinear precoding method to a plurality of symbols to be transmitted to the plurality of receiving terminals and the estimated channel, wherein the second nonlinear precoding method is different from the first nonlinear precoding method; and apply the first nonlinear precoding method and the second nonlinear precoding method to the plurality of symbols and the estimated channel in a combined manner.

7. The precoding device of claim 6, wherein the interference eliminator is further configured to apply the first nonlinear precoding method to substantially eliminate interference between subchannels of the same receiving terminal, and apply the second nonlinear precoding method to substantially eliminate interference between the receiving terminals.

8. The precoding device of claim 7, wherein the first nonlinear precoding method uses a vector perturbation (VP) method.

9. The precoding device of claim 7, wherein the second nonlinear precoding method uses a block Tomlinson-Harashima precoder (BTHP) method.

10. The precoding device of claim 6, further comprising a channel resolver configured to resolve the estimated channel into a block triangular form.

11. The precoding device of claim 10, wherein the channel resolver is further configured to use a block QR scheme to resolve the estimated channel into the block triangular form.

12. A base station in a multi-user multi-antenna environment, the base station comprising:
    a receiver configured to receive feedback information from a plurality of receiving terminals;
    a controller configured to estimate a downlink channel between the base station and each of the plurality of receiving terminals based on the feedback information; and
    an interference eliminator configured to:
        generate a plurality of transmission symbols by applying a first nonlinear precoding method and a second nonlinear precoding method to a plurality of symbols to be transmitted to the plurality of receiving terminals over the estimated channel, wherein the second nonlinear precoding method is different from the first nonlinear precoding method; and
        apply the first nonlinear precoding the second nonlinear precoding method to the plurality of symbols and the estimated channel in a combined manner.

13. The base station of claim 12, wherein the interference eliminator is further configured to apply the first nonlinear precoding method to substantially eliminate interference between subchannels of the same receiving terminal, and apply the second nonlinear precoding method to substantially eliminate interference between the receiving terminals.

14. The base station of claim 13, wherein the first nonlinear precoding method uses the vector perturbation (VP) method.

15. The base station of claim 13, wherein the second nonlinear precoding method uses the block Tomlinson-Harashima precoder (BTHP) method.

16. The base station of claim 12, further comprising a channel resolver configured to resolve the estimated channel into a block triangular form.

17. The base station of claim 16, wherein the channel resolver is further configured to use a block QR scheme to resolve the estimated channel into the block triangular form.

18. The method of claim 3, wherein the second nonlinear precoding method uses a block Tomlinson-Harashima precoder (BTHP) method.

19. The precoding device of claim 8, wherein the second nonlinear precoding method uses a block Tomlinson-Harashima precoder (BTHP) method.

20. The base station of claim 16, wherein the second nonlinear precoding method uses the block Tomlinson-Harashima precoder (BTHP) method.

* * * * *